Patented June 23, 1953

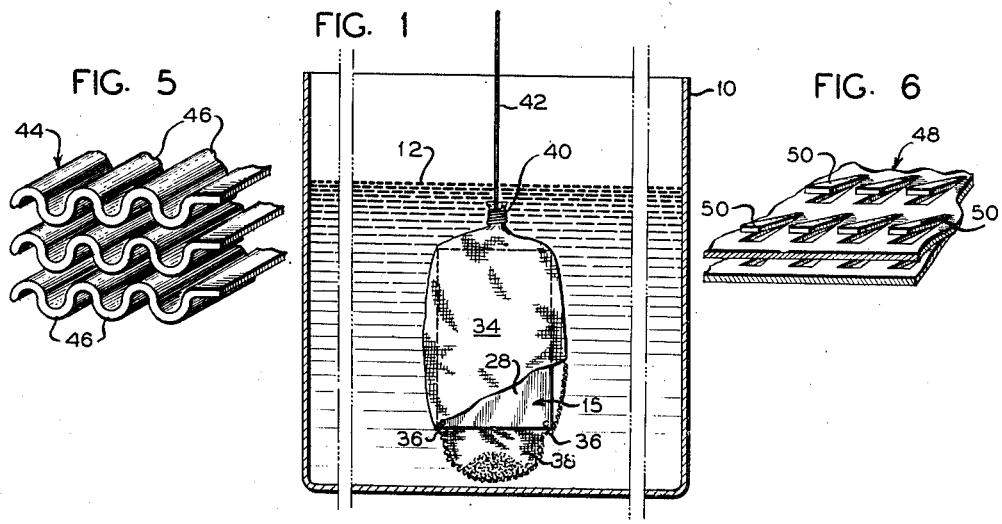
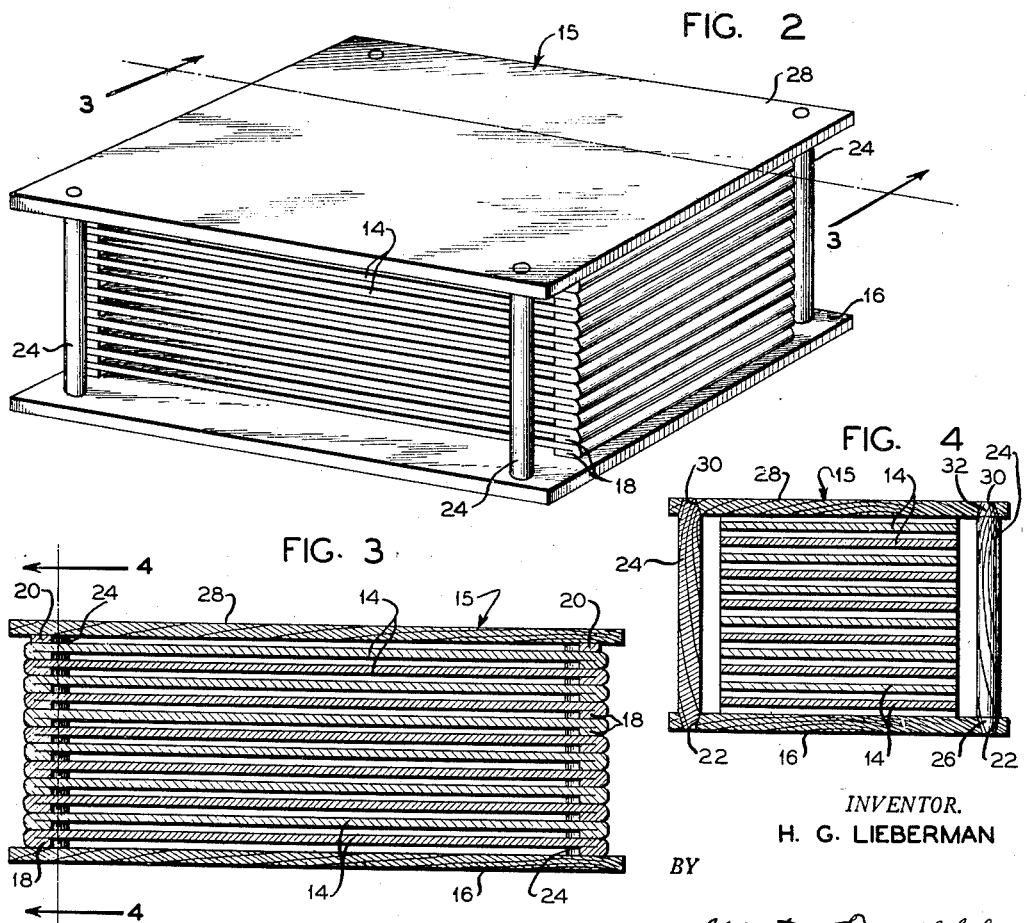

2,643,108

UNITED STATES PATENT OFFICE 2,643,108

SILVER RECOVERING AND COLLECTING DEVICE

Heiman G. Lieberman, Evansville, Ind.

Application February 24, 1950, Serial No. 145,960

12 Claims. (Cl. 266—22)

This invention relates to a silver recovering and collecting device and more particularly to a device for suspension in a solution containing silver salts which will precipitate and retain the silver in a receptacle for facilitating the removal thereof from the tank containing the solution.

Heretofore the processes and apparatus for the separation and recovery of silver from solutions containing silver salts have functioned by the insertion in the solution of zinc dust, ferrous hydroxide or other compounds which precipitate the silver in the metallic form or as insoluble salts, but did not provide any specific means to facilitate the recovery and removal of the precipitated silver from the tank which held the solution.

It is therefore an object of the present invention to provide means such as a porous receptacle for holding zinc plates or other chemicals suspended in a silver salt solution insuring the collection of the silver precipitated, and facilitating the removal thereof.

A further object of this invention is the provision of a frame for holding a plurality of metallic plates in cooperative spaced relation to each other and in spaced relation from the porous receptacle in which they are retained and suspended in solution to facilitate the flow of liquid around and between the metallic plates and the settling of the precipitate to the bottom of the receptacle.

A still further object of the invention is the provision of novel means for maintaining the metallic plates in spaced relation to each other and increasing the area of liquid contact therewith.

Briefly stated, the invention comprises a plurality of plates preferably formed of zinc or other suitable chemicals which will precipitate silver from silver salt solutions such as a photographic fixing bath. These plates are so formed with reversely bent end portions, corrugations, struck out tabs or other equivalent means that when stacked they are maintained in spaced relation and present a maximum surface area for contact with the solution. The stacked plates are retained in this relation by a frame preferably formed of wood, plastic or other suitable material which is chemically inert to the solution or may, if desired, be formed of the same material as the stacked plates. The frame preferably extends beyond the lateral edges of the plates to provide for free circulation of the solution around, through, and between the plates and any projections which may be formed therein. The framework holding the stacked plates is inserted in a porous receptacle which may preferably be in the form of a fabric bag which may have its mouth tied with a suitable cord and be suspended in the solution by any convenient means.

This device may be used for the precipitation and recovery of silver or other valuable components which can be precipitated out of a solution after the solution has fulfilled its intended purpose but is admirably suited for use with photographic fixing solutions for recovering silver from the silver salts dissolved therein during its use as a fixing bath and may advantageously be used during the fixation of photographic plates to maintain the fixing solution at its optimum strength and extend the useful life thereof.

Further objects and advantages of the present invention will be apparent from the following description taken in conjunction with the enclosed drawings wherein:

Fig. 1 is a sectional view of a tank containing a solution of certain salts with one embodiment of a preferred form of the present invention suspended therein and shown with portions broken away;

Fig. 2, a perspective view of the frame holding a plurality of stacked plates and forming a part of the present invention;

Fig. 3, a sectional view taken on line 3—3 of Fig. 2;

Fig. 4, a sectional view taken on the line 4—4 of Fig. 3;

Fig. 5, a fragmentary view of one modified form of the plates; and

Fig. 6, a fragmentary view of another modified form of the plates.

Referring now to the drawings in detail, Fig. 1 shows a tank 10 containing a liquid 12 which may consist of any liquid containing a chemical compound in solution. The device of the present invention while it may be utilized in conjunction with the recovery from any liquid of a chemical compound in solution will be described with particular reference to the recovery of silver from the silver salts which are normally dissolved in a hypo solution during the photographic process of fixation. The solution used for fixation ordinarily contains sodium thiosulphate which is commonly referred to as "hypo."

During the fixation of photographic plates a certain amount of the silver salts is dissolved in the hypo solution and retards the proper fuctioning of the hypo. After a certain amount of silver salts has been dissolved the hypo becomes exhausted and is rendered ineffective for further fixing.

The device of the present invention facilitates the recovery of the silver contained in the silver salts and further rejuvenates the hypo solution and renders it effective for further fixing. The operation may be performed after the hypo has become exhausted or the device of the present invention may be immersed in the solution during its use for photographic purposes to maintain it at its optimum strength.

The plates 14 which are preferably made of zinc in the present example are stacked, as shown more clearly in Figs. 2, 3 and 4, on a base plate 16 in spaced parallel relationship. The inturned end flanges 18 are provided to maintain the spaced relationship between the zinc plates 14 which permits flow of the liquid between the plates in intimate contact with the opposite surfaces thereof. Spacing elements 20 are provided at opposite ends of the uppermost plate 14. Additional spacing elements (not shown) but similar to the elements 20 may also be provided intermediate the ends of the plates 14 to help maintain the parallel spaced relationship.

The base plate 16 is preferably formed of wood, plastic, or other inert material, but may also be formed of zinc to provide additional surfaces which will be active with relation to the solution.

Each corner of the base plate 16 is provided with frusto-conical openings 22. A plurality of corner posts 24 are provided with frusto-conical ends 26 which are mounted in the openings 22. A top plate 28, also provided with frusto-conical openings 30, is placed upon the spacing elements 20 on the uppermost of the zinc plates 14 with the frusto-conical ends 32 of the corner posts 24 extending into the frusto-conical openings 30. By striking each of the corners with a mallet, these corner posts are driven securely into frictional engagement with the openings 22 and 30 in the top and base plates, and, when immersed in the solution, these portions, if made of wood, will swell and securely hold the frame together without danger of disengagement. If the frame is made of plastic, the posts may be driven into a sufficiently tight engagement to retain the posts and the top and base plates in assembled relationship. This assembly is placed in a porous receptacle which, in the present preferred form of the invention, consists of a fabric bag 34, which may be made of any suitable material having sufficient porosity to transmit liquid readily and at the same time effectively retain the silver precipitate.

In the preferred form illustrated, the fabric bag 34 is restricted at 36 to form a collection pocket 38. The restricted portion 36 supports the frame 15 and the zinc plates 14 above the bottom of the bag to provide adequate space for the collection of the silver precipitate over a period of time. The open top portion of the bag is secured at 40 by a cord 42 which is also used to support the bag and its contents in the solution from any suitable support (not shown). A bag may also be utilized without the restriction at 36 and have the frame rest on the bottom.

In the modification shown in Fig. 5, the zinc plates 44 are formed with corrugations 46 to increase the effective surface area for any given size of plate. The plates may be spaced by bending under the end portions in a manner similar to that shown at 18 with reference to the plates 14, or they may be provided with other suitable spacing elements (not shown) to maintain the plates in spaced relationship.

In the modification shown in Fig. 6, each of the zinc plates 48 are provided with a plurality of struck-out projections 50 which not only serve to increase the effective area, but also, by proper staggering, the struck-out projections 50 will serve to maintain the plates in spaced parallel relation.

In the operation of the device, bag 34 containing frame 15 with stacked zinc plates 14 is suspended in the tank 10 containing the hypo solution 12. The tank 10 will ordinarily be provided with suitable means (not shown) for agitating or circulating the solution during the fixation of photographic materials, but the present device will also be effective without circulation of the solution.

As previously stated, the present device may be suspended in the hypo solution after it has become exhausted or it may be suspended in the solution at some position in the tank, where it will not interfere with the normal use thereof, to constantly maintain the solution at its optimum strength.

The normal circulation of the liquid solution in the tank will cause it to flow laterally through the porous bag, between the plates 14 where a precipitation of the silver is caused by the reaction of the silver salts held in solution with the zinc plates. The precipitate will be retained in the receptacle 34 which permits the liquid or solution 12 to pass therethrough but prevents the passage of the silver precipitate.

When the collection pocket 38 becomes substantially filled, or whenever it is desirable, the fabric bag 34 may be withdrawn from the solution and allowed to drain. The frame 15 and zinc plates may be removed from the bag 34 and placed in another similar fabric bag for subsequent use. The silver precipitate may be carried away in the bag 34 and then later removed from the bag for further processing.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. A device for precipitating and recovering silver from a liquid containing silver ions in solution comprising a fabric bag having one open end and a restricted portion adjacent the other end, said bag being formed of a material pervious to the liquid and impervious to the precipitated silver, a plurality of zinc plates maintained in spaced parallel relation by struck out projections, a frame having two plates each engaging one of the opposite and outermost of said zinc plates and extending beyond said zinc plates, and corner posts extending between corresponding corners of said two plates for holding said frame and said zinc plates in assembled relation, said frame and zinc plates in assembled relation being located in said fabric bag and supported above the other end thereof by said restricted portion.

2. A device for precipitating and recovering silver from a liquid containing silver ions in solution comprising a fabric bag having one open end and a restricted portion adjacent the other end, said bag being formed of a material pervious to the liquid and impervious to the precipitated silver a plurality of corrugated zinc plates maintained in spaced parallel relation by inturned end flanges, a frame having two plates each engaging one of the opposite and outermost of said zinc plates and extending beyond said zinc plates, and corner posts extending between corresponding corners of said two plates for holding said frame and said zinc plates in assembled relation, said frame and zinc plates in assembled relation being located in said fabric bag and supported above the other end thereof by said restricted portion.

3. A device for precipitating and recovering silver from a liquid containing silver ions in solution comprising a fabric bag having one open end and a restricted portion adjacent the other end, said bag being formed of a material pervious to the liquid and impervious to the precipitated silver a plurality of zinc plates maintained in spaced parallel relation by inturned end flanges, a wood frame having two plates each engaging one of the opposite and outermost of said zinc plates and extending beyond said zinc plates, and wood corner posts extending between corresponding corners of said two plates for holding said frame and said zinc plates in assembled relation, said frame and zinc plates in assembled relation being located in said fabric bag and supported above the other end thereof by said restricted portion.

4. A device for precipitating and recovering silver from a liquid containing silver ions in solution comprising a fabric bag having one open end and a restricted portion adjacent the other end, said bag being formed of a material pervious to the liquid and impervious to the precipitated silver a plurality of zinc plates maintained in spaced parallel relation by inturned end flanges, a frame having two plates each engaging one of the opposite and outermost of said zinc plates and extending beyond said zinc plates, and corner posts extending between corresponding corners of said two plates for holding said frame and said zinc plates in assembled relation, said frame and zinc plates in assembled relation being located in said fabric bag and supported above the other end thereof by said restricted portion.

5. A device for precipitating and recovering silver from a liquid containing silver ions in solution comprising a closed receptacle containing an active ingredient capable of precipitating the silver, said receptacle being formed of a thin porous material pervious to the liquid and impervious to the precipitated silver, said ingredient consisting of a plurality of zinc plates provided with a plurality of struck out projections adapted to increase the surface area and maintain said plates in spaced parallel relation to each other, and a frame formed of inactive material holding said plates in said relation and spaced from the walls of said receptacle said zinc plates providing continuous substantially vertical passages whereby precipitated silver may fall through and be collected on the bottom of said receptacle.

6. A device for precipitating and recovering silver from a liquid containing silver ions in solution comprising a closed receptacle containing an active ingredient capable of precipitating the silver, said receptacle being formed of a thin porous material pervious to the liquid and impervious to the precipitated silver, said ingredient consisting of a plurality of zinc plates provided with a plurality of struck out projections adapted to increase the surface area and maintain said plates in spaced parallel relation to each other, and a frame holding said plates in said relation and spaced from the walls of said receptacle said zinc plates providing continuous substantially vertical passages whereby precipitated silver may fall through and be collected on the bottom of said receptacle.

7. A device for precipitating and recovering silver from a liquid containing silver ions in solution comprising a closed receptacle containing an active ingredient capable of precipitating the silver, said receptacle being formed of a thin porous material pervious to the liquid and impervious to the precipitated silver, said ingredient consisting of a plurality of zinc plates corrugated and maintained in spaced parallel relation to each other, and a frame formed of zinc holding said plates in said relation and spaced from the walls of said receptacle said zinc plates providing continuous substantially vertical passages whereby precipitated silver may fall through and be collected on the bottom of said receptacle.

8. A device for precipitating and recovering silver from a liquid containing silver ions in solution comprising a closed receptacle containing an active ingredient capable of precipitating the silver, said receptacle being formed of a thin porous material pervious to the liquid and impervious to the precipitated silver, said ingredient consisting of a plurality of zinc plates corrugated and maintained in spaced parallel relation to each other, and a frame formed of inactive material holding said plates in said relation and spaced from the walls of said receptacle said zinc plates providing continuous substantially vertical passages whereby precipitated silver may fall through and be collected on the bottom of said receptacle.

9. A device for precipitating and recovering silver from a liquid containing silver ions in solution comprising a closed receptacle containing an active ingredient capable of precipitating the silver, said receptacle being formed of a thin porous material pervious to the liquid and impervious to the precipitated silver, said ingredient consisting of a plurality of zinc plates maintained in spaced parallel relation to each other, and a frame formed of inactive material holding said plates in said relation and spaced from the walls of said receptacle said zinc plates providing continuous substantially vertical passages whereby precipitated silver may fall through and be collected on the bottom of said receptacle.

10. A device for precipitating and recovering silver from a liquid containing silver ions in solution comprising a fabric bag having one open end and a restricted portion adjacent the other end, said bag being formed of a material pervious to the liquid and impervious to the precipitated silver, a plurality of zinc plates maintained in spaced parallel relation by integrally formed spacing elements, a frame having two plates each engaging one of the opposite and outermost of said zinc plates and extending beyond said zinc plates, and corner posts extending between corresponding corners of said two plates for holding said frame and said zinc plates in assembled relation, said frame and zinc plates in assembled relation being located in said fabric bag and supported above the other end thereof by said restricted portion.

11. A device for precipitating and recovering silver from a liquid containing silver ions in solution comprising a porous, thin-walled receptacle having one open end and a restricted portion adjacent the other end, said bag being formed of a material pervious to the liquid and impervious to the precipitated silver, a plurality of zinc plates maintained in spaced relation by spacing elements, a frame engaging the opposite and outermost of said zinc plates and extending beyond said zinc plates, and means to maintain said frame and said zinc plates in assembled relation, said frame and zinc plates in assembled relation being located in said fabric bag and supported above the other end thereof by said restricted portion.

12. A device for precipitating and recovering silver from a liquid containing silver ions in solution, comprising a receptacle having sides and a bottom formed of thin porous material, an assembly positioned within the receptacle and formed of insoluble material reactive with the ions, said assembly having continuous substantially vertical passages, means to maintain the assembly above the bottom of the receptacle whereby precipitated material may fall through the passages and be collected on said bottom of said receptacle.

HEIMAN G. LIEBERMAN.

References Cited in the file of this patent

UNITED STATES PATENTS

| Number | Name | Date |
|---|---|---|
| 35,842 | Shaw | July 8, 1862 |
| 731,839 | Bahn | June 23, 1903 |
| 951,372 | Judd | Mar. 8, 1910 |
| 1,349,086 | Murphy | Aug. 10, 1920 |

FOREIGN PATENTS

| Number | Country | Date |
|---|---|---|
| 805,048 | France | Aug. 17, 1936 |